United States Patent
Miki et al.

(10) Patent No.: US 10,529,988 B2
(45) Date of Patent: Jan. 7, 2020

(54) FLUORIDE ION BATTERY

(71) Applicant: Toyota Jidosha Kabushiki Kaisha, Toyota-shi, Aichi-ken (JP)

(72) Inventors: Hidenori Miki, Hiratsuka (JP); Masumi Sato, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 72 days.

(21) Appl. No.: 15/954,920

(22) Filed: Apr. 17, 2018

(65) Prior Publication Data
US 2018/0309127 A1    Oct. 25, 2018

(30) Foreign Application Priority Data

Apr. 24, 2017 (JP) .................................. 2017-085151
Nov. 24, 2017 (JP) .................................. 2017-225841

(51) Int. Cl.
| | |
|---|---|
| H01M 4/36 | (2006.01) |
| H01M 4/58 | (2010.01) |
| H01M 10/0562 | (2010.01) |
| H01M 6/18 | (2006.01) |
| H01M 4/02 | (2006.01) |
| H01M 4/136 | (2010.01) |
| H01M 4/1397 | (2010.01) |
| H01M 4/66 | (2006.01) |

(52) U.S. Cl.
CPC ......... *H01M 4/5815* (2013.01); *H01M 6/183* (2013.01); *H01M 10/0562* (2013.01); *H01M 4/136* (2013.01); *H01M 4/1397* (2013.01); *H01M 4/582* (2013.01); *H01M 4/661* (2013.01); *H01M 6/188* (2013.01); *H01M 2004/028* (2013.01); *H01M 2300/008* (2013.01)

(58) Field of Classification Search
None
See application file for complete search history.

(56) References Cited

U.S. PATENT DOCUMENTS

2016/0043439 A1    2/2016    Nakamoto et al.

FOREIGN PATENT DOCUMENTS

| | | |
|---|---|---|
| JP | H05325973 A | 12/1993 |
| JP | 2016-038959 A | 3/2016 |
| JP | 2018-073753 A | 5/2018 |

*Primary Examiner* — Yoshitoshi Takeuchi
(74) *Attorney, Agent, or Firm* — Dinsmore & Shohl LLP (57) ABSTRACT

A main object of the present disclosure is to provide a fluoride ion battery having a high charge-discharge potential. The present disclosure achieves the object by providing a fluoride ion battery comprising a cathode active material layer, an anode active material layer, and an electrolyte layer formed between the cathode active material layer and the anode active material layer, and the cathode active material layer includes a cathode active material having a composition represented by $Cu_xS$, wherein $1 \leq x \leq 2$.

2 Claims, 5 Drawing Sheets

FIG. 6A
Example 2

FIG. 6B
Comparative Example 2

FIG. 7A
Example 3

FIG. 7B
Example 4

FLUORIDE ION BATTERY

CROSS-REFERENCE TO RELATED APPLICATIONS

The present application claims priority to Japanese Patent Application No. 2017-085151 filed on Apr. 24, 2017, and Japanese Patent Application No. 2017-225841 filed on Nov. 24, 2017, the entire contents of both of which are incorporated in the present specification by reference.

TECHNICAL FIELD

The present disclosure relates to a fluoride ion battery.

BACKGROUND ART

As high-voltage and high-energy density batteries, for example, Li ion batteries are known. The Li ion battery is a cation-based battery utilizing the reaction between a Li ion and a cathode active material, and the reaction between a Li ion and an anode active material. Meanwhile, as anion-based batteries, fluoride ion batteries utilizing the reaction of a fluoride ion (a fluoride anion) are known.

For example, Patent Literature 1 discloses the use of Cu as the cathode active material of a fluoride ion battery. As described in Patent Literature 1, metals (Me) such as Cu are known to exhibit a function as the active material of a fluoride ion battery by a fluorination-defluorination reaction ($MeF_x + xe^- \leftrightarrow Me + xF^-$). Also, Patent Literature 2 discloses a fluoride ion battery utilizing $PbSnF_4$ as a solid electrolyte.

CITATION LIST

Patent Literature

Patent Literature 1: Japanese Patent Application Laid-Open (JP-A) No. 2016-038959
Patent Literature 2: JP-A No. H05-325973

SUMMARY OF DISCLOSURE

Technical Problem

It is known that the capacity of the fluoride ion battery can be increased by using Cu as the cathode active material of the fluoride ion battery as described in Patent Literature 1. However, it is difficult to sufficiently utilize the charged energy, since the discharge potential thereof is low.

The present disclosure has been made in view of the above circumstances, and an object thereof is to provide a fluoride ion battery having a high charge-discharge potential.

Solution to Problem

In order to achieve the object, the present disclosure provides a fluoride ion battery comprising a cathode active material layer, an anode active material layer, and an electrolyte layer formed between the cathode active material layer and the anode active material layer, and the cathode active material layer includes a cathode active material having a composition represented by $Cu_xS$, wherein $1 \leq x \leq 2$.

According to the present disclosure, the charge-discharge potential may be increased since the cathode active material layer includes the cathode active material having a composition represented by $Cu_xS$, wherein $1 \leq x \leq 2$.

In the disclosure, the x may satisfy $1.8 \leq x \leq 2$.

Advantageous Effects of Disclosure

The fluoride ion battery of the present disclosure exhibits effects such as the charge-discharge potential thereof is high.

DESCRIPTION OF EMBODIMENTS

The fluoride ion battery in an embodiment of the present disclosure will be hereinafter described in detail.

The fluoride ion battery in an embodiment of the present disclosure is a fluoride ion battery comprising a cathode active material layer, an anode active material layer, and an electrolyte layer formed between the cathode active material layer and the anode active material layer, and the cathode active material layer includes a cathode active material having a composition represented by $Cu_xS$, wherein $1 \leq x \leq 2$.

Figure 1:
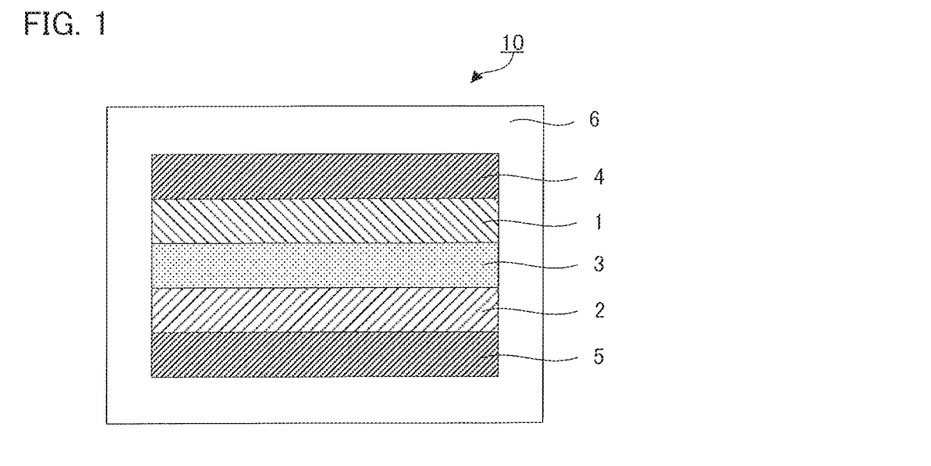
FIG. 1 is a schematic cross-sectional view showing an example of the fluoride ion battery of the present disclosure.

FIG. 1 is a schematic cross-sectional view showing an example of the fluoride ion battery of the present disclosure. Fluoride ion battery 10 shown in FIG. 1 comprises cathode active material layer 1, anode active material layer 2, electrolyte layer 3 formed between cathode active material layer 1 and anode active material layer 2, cathode current collector 4 that collects current of cathode active material layer 1, anode current collector 5 that collects current of anode active material layer 2, and battery case 6 that houses these members.

Incidentally, the battery voltage of a fluoride ion battery is low compared to a Li ion battery. Specifically, a Li ion battery may be a battery of up to approximately 5 V. Meanwhile, the limit of the battery voltage of a current fluoride ion battery is, for example, approximately 3.1 V, when Cu cathode (0.7 V versus $Pb/Pb^{2+}$) and $LaF_3$ anode ($-2.4$ V versus $Pb/Pb^{2+}$). The battery voltage is a factor directly linked to the power and the energy density of a battery. Accordingly, a fluoride ion battery having a higher battery voltage is demanded.

A reason for the fluoride ion battery to be low in battery voltage is because a high potential cathode active material remains undiscovered. As the cathode active material used for the fluoride ion battery, a simple substance of Cu, for example, is currently known. The potential of the simple substance of Cu is 0.7 V versus Pb/Pb$^{2+}$ and a high potential cathode active material that goes beyond this is not known.

A reason for the discharge potential to be low when using a simple substance of Cu as the cathode active material is presumed, for example, as follows. That is, a solid electrolyte is oxidatively decomposed upon charge at the surface where the solid electrolyte and a cathode active material, that is an electron conductor, are in contact with each other, and an oxidative decomposition product occurs. The oxidative decomposition product that occurs in this instance does not have fluoride ion conductivity. Therefore, the conduction of the fluoride ion is inhibited by the oxidative decomposition product to cause high resistance, and this makes the overvoltage higher so that the low discharge potential is presumed.

In contrast to this, the present inventors have found out $Cu_xS$ as a high potential cathode active material. In the present disclosure, the charge-discharge potential may be made higher by using a cathode active material layer including $Cu_xS$ as a cathode active material; as a result, higher energy density and higher power of a fluoride ion battery may be achieved. Although a specific reason why the charge-discharge potential may be made higher by using $Cu_xS$ as the cathode active material is not clear, it is presumed as follows. Not intending to be bound by any theory, in the present disclosure, the charge-discharge of the fluoride ion battery is influenced in some way since the cathode active material layer includes not only Cu but also S as the cathode active material; as the result, the theoretical potential is presumed to be varied. Incidentally, although the charge-discharge potential may be made higher in the present disclosure, the variation of the charge-discharge potential in this instance is not due to the overvoltage caused by the resistance within the fluoride ion battery, but may be said that the charge-discharge potential is varied theoretically. This is clear from the results in the later described Examples. Specifically, when the voltage is varied due to the overvoltage, the discharge potential usually tends to decrease when the charge potential increases (when resistance is made higher), whereas the discharge potential usually tends to increase when the charge potential decreases (when resistance is made lower). In contrast, according to the results in the later described Examples, both the charge potential and the discharge potential are high in the fluoride ion battery according to the present disclosure. Accordingly, the theoretical potential may be said to be varied in the fluoride ion battery according to the present disclosure.

The fluoride ion battery of the present disclosure will be hereinafter described with respect to each constitution.

1. Cathode Active Material Layer

The cathode active material layer in the present disclosure is a layer including a cathode active material. Also, the cathode active material layer may further include at least one of a solid electrolyte, a conductive material, and a binder besides the cathode active material. Among the above, in the present disclosure, the later described solid electrolyte may be included as the solid electrolyte.

The thickness of the cathode active material layer may be appropriately adjusted according to the constitution of the fluoride ion battery, and not particularly limited.

(1) Cathode Active Material

The cathode active material in the present disclosure has a composition represented by $Cu_xS$, wherein $1 \leq x \leq 2$. The cathode active material is fluorinated upon charge of the fluoride ion battery, and is defluorinated upon discharge.

In some embodiments, x is $Cu_xS$ is 1 or more. In other embodiments, x may be 1.3 or more, may be 1.5 or more, or may be 1.8 or more. When x is too small, the capacity may be low. Meanwhile, x in $Cu_xS$ is usually 2 or less, and may be 1.9 or less. When x is too large, the potential may be low.

The content of the cathode active material in the cathode active material layer may be 20% by weight or more, for example, may be 40% by weight or more, or may be 60% by weight or more. The cathode active material layer may include nothing but the cathode active material having a composition represented by $Cu_xS$, wherein $1 \leq x \leq 2$, as the cathode active material, and may include other cathode active material. In the latter case, the cathode active material having a composition represented by $Cu_xS$, wherein $1 \leq x \leq 2$ is a main component (maximum in weight ratio) in the cathode active material.

Examples of the shape of the cathode active material in the present disclosure may include a granular shape (cathode active material particle). Examples of the specific shape of the cathode active material particle may include a spherical shape and an oval spherical shape. The average particle size ($D_{50}$) of the cathode active material particle is, for example, in a range of 10 nm or more and 50 μm or less, or in a range of 20 nm or more and 10 μm or less, among the above. Incidentally, the average particle size of the cathode active material particle may be measure, for example, by an observation with a scanning electron microscope (SEM) (such as n≥20). Also, it may be calculated from the measured value of BET specific surface area.

(2) Conductive Material

The conductive material in the cathode active material layer may have a desired electron conductivity. Examples of the conductive material may include carbon materials. Examples of the carbon material may include carbon blacks such as actylene black, furnace black, and thermal black; graphene; fullerene; and carbon nanotube.

(3) Solid Electrolyte

The content of the solid electrolyte in the cathode active material layer may be, for example, in a range of 10% by weight or more and 80% by weight or less.

Other matters relating to the solid electrolyte will be explained in the later described "2. Electrolyte layer"; thus, the descriptions herein are omitted.

(4) Binder

The binder is not particularly limited if it is chemically and electronically stable, and examples thereof may include fluorine based binders such as polyvinylidene fluoride (PVDF) and polytetrafluoroethylene (PTFE).

2. Electrolyte Layer

The electrolyte layer in the present disclosure is a layer formed between the cathode active material layer and the anode active material layer. The electrolyte included in the electrolyte layer may be a liquid electrolyte (electrolyte solution), or may be a solid electrolyte.

The electrolyte solution in the present disclosure contains, for example, a fluoride salt and an organic solvent. Examples of the fluoride salt may include an inorganic fluoride salt, an organic fluoride salt, and an ionic liquid. An example of the inorganic fluoride salt may be XF (X is Li, Na, K, Rb or Cs). An example of the cation of the organic fluoride salt may be an alkyl ammonium cation such as a tetramethyl ammonium cation. The concentration of the fluoride salt in the electrolyte solution is, for example, in a range of 0.1 mol % to 40 mol %, or in a range of 1 mol % to 10 mol %.

The organic solvent for the electrolyte solution is usually a solvent that dissolves the fluoride salt. Examples of the organic solvent may include glyme such as triethylene glycol dimethyl ether (G3) and tetraethylene glycol dimethyl ether (G4); cyclic carbonates such as ethylene carbonate (EC), fluoro ethylene carbonate (FEC), difluoro ethylene carbonate (DFEC), propylene carbonate (PC), and butylene carbonate (BC); and chain carbonates such as dimethyl carbonate (DMC), diethyl carbonate (DEC), and ethyl methyl carbonate (EMC). Also, an ionic liquid may be used as the organic solvent.

On the other hand, examples of the solid electrolyte may include a fluoride of a lanthanoid element such as La and Ce; a fluoride of an alkaline element such as Li, Na, K, Rb, and Cs; and a fluoride of an alkaline earth element such as Ca, Sr, and Ba. Specific examples may include a fluoride of La and Ba (such as $La_{0.9}Ba_{0.1}F_{2.9}$) and a fluoride of Pb and Sn. In some embodiments of the present disclosure, the solid electrolyte may include at least Pb, Sn, and F. In this case, the solid electrolyte may include nothing but the above described three elements, and may further include other element. Examples of the other element may include Sm. When other element is included, other element may be doped, based on the solid electrolyte including Pb, Sn, and F. Usually, F in the solid electrolyte functions as a fluoride ion ($F^-$) that is a carrier.

When the solid electrolyte in the present disclosure include at least Pb, Sn, and F, the total proportion of the Pb element, the Sn element, and the F element to the total of all the elements in the solid electrolyte is, for example, 70 mol % or more, 80 mol % or more, or even 90 mol % or more. Also, in some embodiments of the present disclosure, the proportion may be 100 mol %. Incidentally, the total proportion of the Pb element, the Sn element and the F element may be obtained by, for example, a Raman spectroscopy, a NMR, and an XPS.

In some embodiments, the solid electrolyte in the present disclosure may have, for example, a composition represented by a general formula $Pb_{1-x}Sn_xF_2$, wherein $0<x<1$. The value of x in the above general formula is more than 0, 0.2 or more, or even 0.4 or more. Also, value of x in the above general formula is less than 1, or 0.6 or less. More specific examples of the solid electrolyte may include $Pb_{0.4}Sn_{0.6}F_2$ wherein x is 0.6, and $Pb_{0.6}Sn_{0.4}F_2$ wherein x is 0.4. In some embodiments of the present disclosure, the solid electrolyte may be $Pb_{0.6}Sn_{0.4}F_2$ wherein x is 0.4. Incidentally, the composition of the solid electrolyte in the present disclosure may be confirmed by carrying out, for example, inductively coupled plasma (ICP) optical emission spectrometry.

The reduction potential of the solid electrolyte in the present disclosure is, for example, 0.2 V (versus $Pb/PbF_2$) or more, or 0.3 V (versus $Pb/PbF_2$) or more. Also, the oxidation potential of the solid electrolyte is, for example, 1.4 V (versus $Pb/PbF_2$) or less, or 1.3 V (versus $Pb/PbF_2$) or less. The reduction potential and the oxidation potential of the solid electrolyte may be obtained by, for example, cyclic voltammetry (CV).

3. Anode Active Material Layer

The anode active material layer in the present disclosure is a layer including an anode active material. Also, the anode active material layer may further include at least one of a solid electrolyte, a conductive material, and a binder besides the anode active material. In some embodiments of the present disclosure, a material of the above described solid electrolyte may be included as the solid electrolyte.

The anode active material is usually an active material fluorinated upon discharge. Also, for the anode active material, any active material having lower potential than the cathode active material may be selected. Therefore, the above described cathode active material may be used as the anode active material. Examples of the anode active material may include a simple substance of a metal, a metal alloy, a metal oxide, and a fluoride thereof. Examples of the metal element included in the anode active material may include La, Ca, Al, Eu, Li, Si, Ge, Sn, In, V, Cd, Cr, Fe, Zn, Ga, Ti, Nb, Mn, Yb, Zr, Sm, Ce, Mg, and Pb. Among the above, in some embodiments, the anode active material may include at least one of Mg, $MgF_x$, Al, $AlF_x$, Ce, $CdF_x$, Ca, $CaF_x$, Pb, or $PbF_x$. Incidentally, the above described x is a real number greater than 0. Also, as the anode active material, the above described carbon materials and polymer materials may be used.

The content of the anode active material in the anode active material layer may be large in terms of the capacity, and is, for example, 30% by weight or more, 50% by weight or more, or 70% by weight or more.

The thickness of the anode active material layer may be appropriately adjusted according to the constitution of the fluoride ion battery, and thus is not particularly limited.

The conductive material and the binder may be similar to those described in "1. Cathode active material layer" above; thus, the descriptions herein are omitted.

4. Other Constitutions

The fluoride ion battery according to the present disclosure comprises at least the above described cathode active material layer, anode active material layer, and electrolyte layer. Further, the fluoride ion battery usually comprises a cathode current collector for collecting currents of the cathode active material layer, and an anode current collector for collecting currents of the anode active material layer.

Examples of the shape of the cathode current collector and anode current collector may include a foil shape, a mesh shape, and a porous shape.

5. Fluoride Ion Battery

The fluoride ion battery according to the present disclosure may be a solid battery. Also, the fluoride ion battery in the present disclosure may be a primary battery or may be a secondary battery. In some embodiments, the fluoride ion battery may be a secondary battery, so as to be repeatedly charged and discharged, and is useful as, for example, a car-mounted battery. Incidentally, the primary battery includes a usage of a secondary battery as a primary battery (the use for the purpose of just one time discharge after charge). Also, examples of the shape of the fluoride ion battery in the present disclosure may include a coin shape, a laminate shape, a cylindrical shape, and a square shape. Also, a battery case used for the fluoride ion battery is not particularly limited.

Incidentally, the present disclosure is not limited to the embodiments. The embodiments are exemplification, and any other variations are intended to be included in the technical scope of the present disclosure if they have substantially the same constitution as the technical idea described in the claim of the present disclosure and offer similar operation and effect thereto.

EXAMPLES

The present disclosure will be described in more details with reference to Examples.

Example 1

Figure 2:
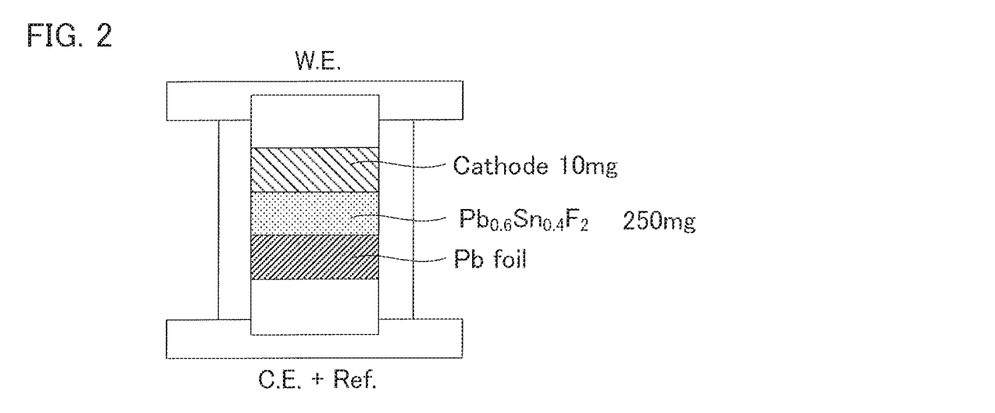
FIG. 2 is a schematic diagram of the experimental equipment used in Example 1 and Comparative Example 1.

<Cathode Active Material>
As a cathode active material particle, CuS was prepared. The average particle size ($D_{50}$) of CuS was 5 μm.
<Production of Cathode Mixture>
As a solid electrolyte, $Pb_{0.6}Sn_{0.4}F_2$ was produced in a glove box under an argon atmosphere. Specifically, raw materials of $PbF_2$ and $SnF_2$ were weighed so as to be $PbF_2:SnF_2=3:2$ in the molar ratio. By carrying out a mechanical milling, using a ball mill apparatus, of the obtained raw materials, $Pb_{0.6}Sn_{0.4}F_2$ was obtained. Also, as a conductive material, acetylene black was prepared. A cathode mixture was obtained by mixing the above described raw materials in a weight ratio of cathode active material:solid electrolyte:conductive material=25:70:5.
<Production of Secondary Battery>
As cathode current collector and anode current collector, Pb foils were prepared. A solid electrolyte layer was produced by weighing 250 mg of the above described solid electrolyte in a ceramic mold of 1 cm², and pressing under the pressure of 1 ton/cm² ($10^3$ kg/cm²). A cathode active material layer was produced by putting 10 mg of the cathode mixture on one side of the obtained solid electrolyte layer and pressing under the pressure of 1 ton/cm². The Pb foils were placed on the surface of the cathode active material layer and the solid electrolyte layer. After that, the whole was pressed under the pressure of 4 ton/cm². As described above, a secondary battery shown in FIG. 2 having a pellet shape of 1 cm² was obtained. The secondary battery had a constitution wherein a cathode current collector, a cathode active material layer, solid electrolyte layer, and an anode current collector were stacked in this order. Incidentally, the anode active material layer is self-formed at the interface of the solid electrolyte layer and the anode current collector.

Comparative Example 1

A second battery was produced in the same manner as in Example 1 except that a simple substance particle of Cu was used as the cathode active material particle.

Evaluation

Figure 3:
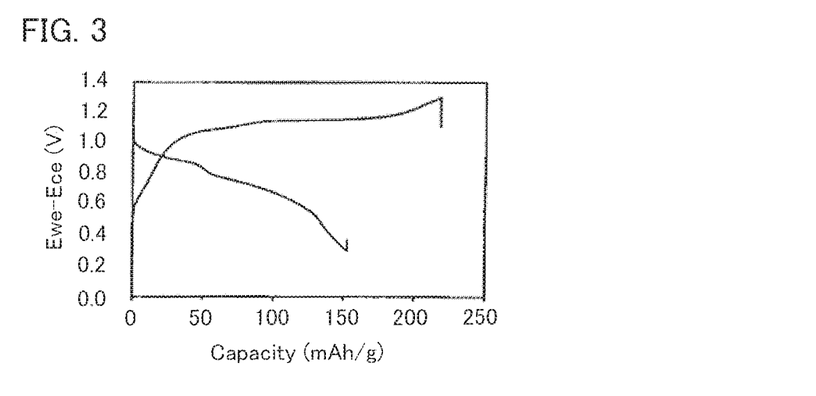
FIG. 3 is a charge-discharge curve of the fluoride ion battery obtained in Example 1.
Figure 4:
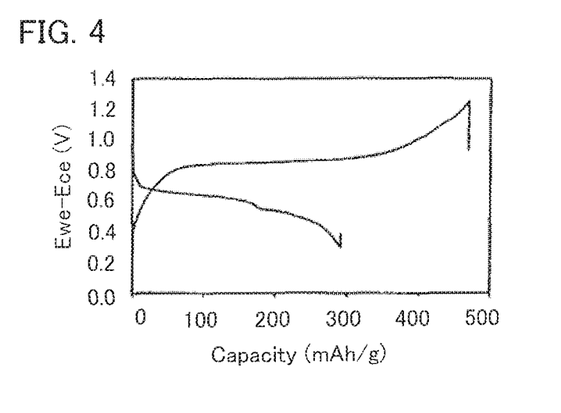
FIG. 4 is a charge-discharge curve of the fluoride ion battery obtained in Comparative Example 1.

<Charge and Discharge Test>
The following charge and discharge test was carried out for each secondary battery produced in Example 1 and Comparative Example 1. A process wherein the cathode active material is fluorinated and the anode active material is defluorinated was regarded as "charge", whereas a process wherein the cathode active material is defluorinated and the anode active material is fluorinated was regarded as "discharge". The battery was evaluated in a desiccator while vacuuming. One cycle of charge and discharge test was carried out under the following measurement conditions: charging at 40 μA, discharging at −20 μA, in a range of 1.3 V (versus $Pb/PbF_2$) to 0.3 V (versus $Pb/PbF_2$), and the temperature in the desiccator of 140° C. The charging and discharging curves are shown in FIGS. 3 and 4. Also, in FIG. 5, the charging and discharging curves in FIG. 3 and in FIG. 4 are compared.

Figure 5:
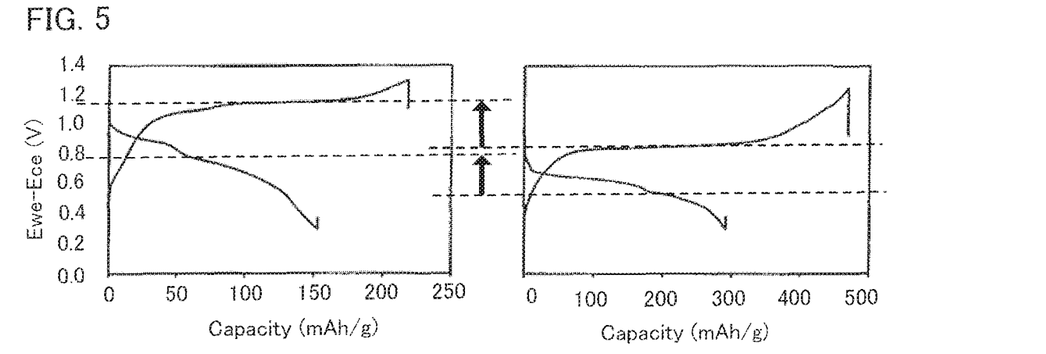
FIG. 5 is a charge-discharge curve of the fluoride ion battery obtained in Example 1 and in Comparative Example 1, respectively.

It was found out that the fluoride ion battery obtained in Example 1 shows high potential in both charge potential and discharge potential compared to the fluoride ion battery obtained in Comparative Example 1, by comparing FIG. 3 showing the charging and discharging curves of the fluoride ion battery obtained in Example 1 to FIG. 4 showing the charging and discharging curves of the fluoride ion battery obtained in Comparative Example 1, as shown in FIG. 5. As described above, it may be said that the reason why the charge-discharge potential of the fluoride ion battery obtained in Example 1 varied is because the charge-discharge potential varied theoretically, but not because the overvoltage due to the resistance in the battery. If the overvoltage due to the resistance in the battery is the cause, for example, the discharge potential tends to decrease when the charge potential increases (when resistance is made higher), whereas the discharge potential tends to increase when the charge potential decreases (when resistance is made lower).

Example 2

CuS was prepared as a cathode active material particle, $PbF_2$ was produced as a solid electrolyte, and actylene black was prepared as a conductive material. A cathode mixture was obtained by mixing the above described raw materials in a weight ratio of cathode active material:solid electrolyte:conductive material=25:70:5, and carrying out a mechanical milling using a ball mill apparatus under conditions of 300 rpm for 12 hours. A secondary battery was produced in the same manner as in Example 1 except that the obtained cathode mixture was used.

Example 3

A secondary battery was produced in the same manner as in Example 2 except that $Cu_{1.8}S$ was used as the cathode active material particle.

Example 4

A secondary battery was produced in the same manner as in Example 2 except that $Cu_2S$ was used as the cathode active material particle.

Comparative Example 2

A secondary battery was produced in the same manner as in Example 2 except that a simple substance particle of Cu was used as the cathode active material particle.

Evaluation

Figure 6A:
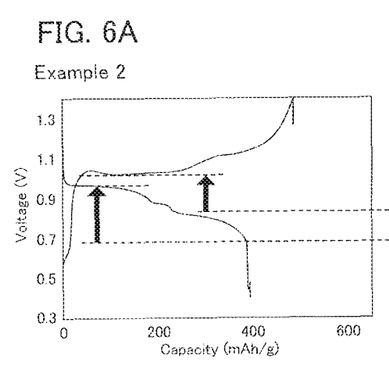
FIGS. 6A and 6B are charge-discharge curves of the fluoride ion battery obtained in Example 2 and in Comparative Example 2, respectively.
Figure 6B:
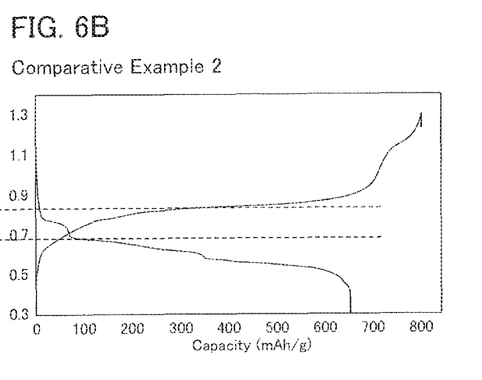
Figure 7A:
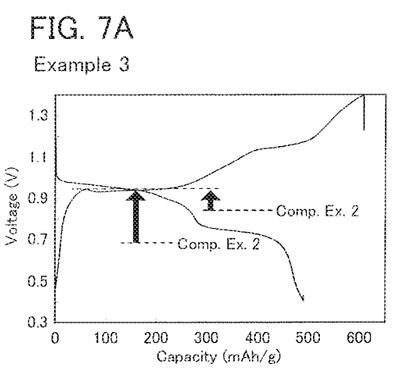
FIGS. 7A and 7B are charge-discharge curves of the fluoride ion battery obtained in Examples 3 and 4, respectively.
Figure 7B:
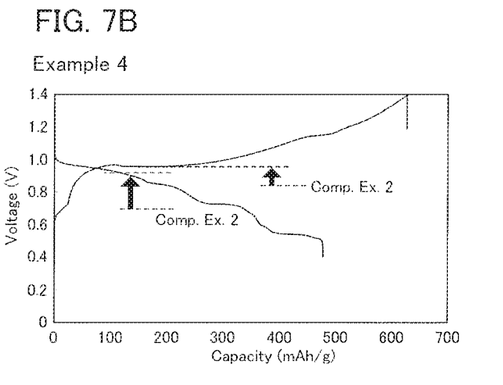

<Charge and Discharge Test>
The following charge and discharge test was carried out for each secondary battery produced in Examples 2 to 4 and in Comparative Example 2. The battery was evaluated in a desiccator while vacuuming. One cycle of charge and discharge test was carried out under the following measurement conditions: charging at 40 μA, discharging at −20 μA, and the temperature in the desiccator of 140° C. The voltage range was in a range of 1.4 V (versus $Pb/PbF_2$) to 0.4 V (versus $Pb/PbF_2$) in Examples 2 to 4, and in a range of 1.3 V (versus $Pb/PbF_2$) to 0.3 V (versus $Pb/PbF_2$) in Comparative Example 2. The charging and discharging curves are shown in FIGS. 6 and 7.

As shown in FIGS. 6A, 6B, 7A, and 7B, it was found out that the fluoride ion battery obtained in Examples 2 to 4 show high potential in both charge potential and discharge potential compared to the fluoride ion battery obtained in Comparative Example 2. Also, in Examples 2 to 4, similar to Example 1, it may be said that the charge-discharge potential varied theoretically, but not because the overvoltage due to the resistance in the battery. Also, although the charge potential and the discharge potential in Examples 3 and 4 was at the same level as in Example 2, it was confirmed that the capacity was higher than Example 2.

<XPS Measurement>

Figure 8A:
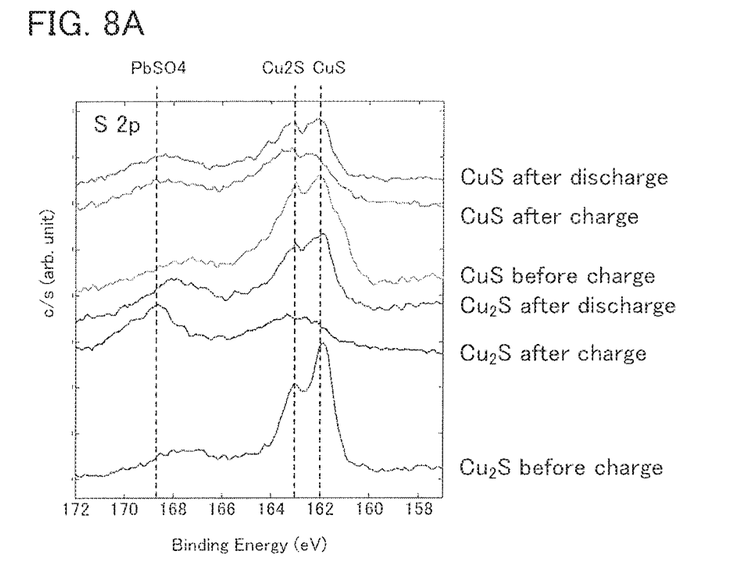
FIGS. 8A and 8B are diagrams showing the XPS measurement results of the cathode active materials in Example 2 (CuS) and in Example 4 ($Cu_2S$).
Figure 8B:
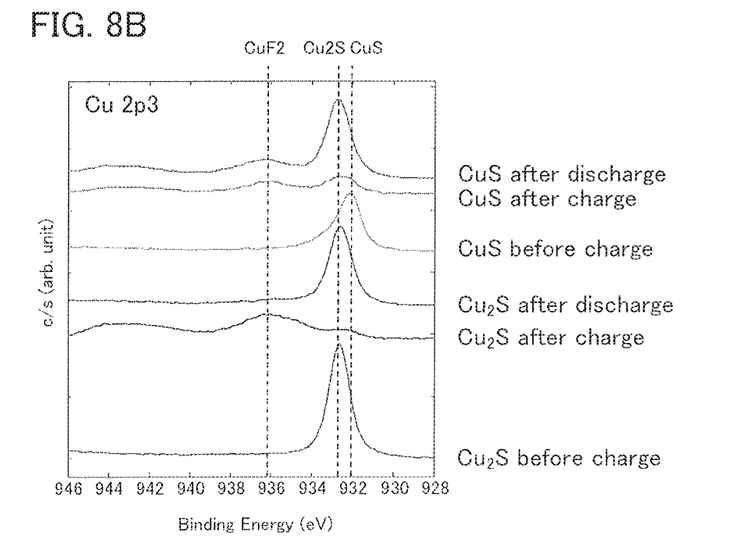

X-ray photoelectron spectroscopic (XPS) measurement was carried out to the cathode active material of the secondary batteries produced in Example 2 (CuS) and in Example 4 ($Cu_2S$), in the following states: before charge, after charge, and after discharge. The results thereof are shown in FIGS. 8A and 8B. As shown in FIGS. 8A and 8B, in Example 2 (CuS), the valences of both Co and S were varied so that the influence on the charge-discharge capacity was confirmed, and a similar tendency was also confirmed in Example 4 ($Cu_2S$). Meanwhile, compared to Example 2 (CuS), the valence variation of Cu and the valence variation of S were larger in Example 4 ($Cu_2S$), and it was suggested that these valence variations contribute to increase in capacity.

Comparative Example 3

A secondary battery was produced in the same manner as in Comparative Example 2 except that a simple substance of S was further used, and the composition of the cathode active material was changed to $CuS_{0.1}$ ($Cu_{10}S$).

Example 5

A secondary battery was produced in the same manner as in Comparative Example 2 except that a simple substance of S was further used, and the composition of the cathode active material was changed to $CuS_{0.5}$ ($Cu_2S$).

Example 6

A secondary battery was produced in the same manner as in Comparative Example 2 except that a simple substance of S was further used, and the composition of the cathode active material was changed to $CuS_{0.56}$ ($Cu_{1.8}S$).

Example 7

A secondary battery was produced in the same manner as in Comparative Example 2 except that a simple substance of S was further used, and the composition of the cathode active material was changed to CuS.

Evaluation

<Charge and Discharge Test>

The following charge and discharge test was carried out for each secondary battery produced in Examples 5 to 7 and in Comparative Examples 2 and 3. The battery was evaluated in a desiccator while vacuuming. One cycle of charge and discharge test was carried out under the following measurement conditions: charging at 40 μA, discharging at −20 μA, in a range of 1.4 V (versus $Pb/PbF_2$) to 0.4 V (versus $Pb/PbF_2$), and the temperature in the desiccator of 140° C. The charge potential and discharge potential were obtained from the charging and discharging curves. The results are shown in FIG. 9.

Figure 9:
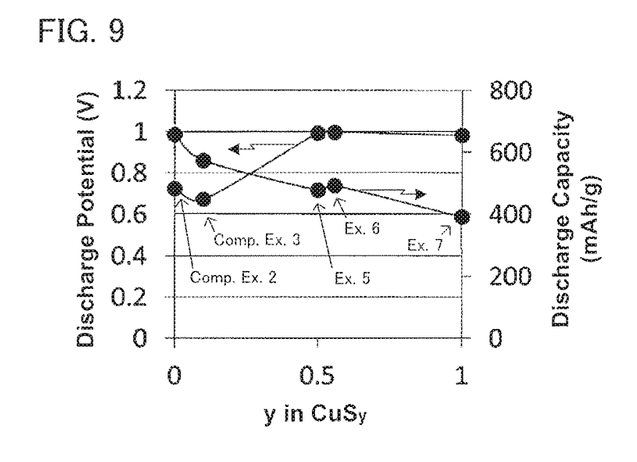
FIG. 9 is a diagram showing the results of the charge potential and the charge capacity of the fluoride ion batteries obtained in Examples 5 to 7 and in Comparative Examples 2 and 3.

As shown in FIG. 9, it was confirmed that the potential was higher in Examples 5 to 7 than in Comparative Example 2. Meanwhile, there was a tendency that the charge capacity decreases when the value of y in $CuS_y$ increases. In Examples 5 and 6, it was confirmed that the decrease of the charge capacity may be suppressed while increasing the charge potential.

REFERENCE SIGNS LIST 1 cathode active material layer
2 electrolyte layer
3 anode active material layer
4 cathode current collector
5 anode current collector
10 fluoride ion battery

What is claimed is:

1. A fluoride ion battery comprising a cathode active material layer, an anode active material layer, and an electrolyte layer formed between the cathode active material layer and the anode active material layer, and
   the cathode active material layer includes a cathode active material having a composition represented by $Cu_xS$, wherein $1 \leq x \leq 2$.

2. The fluoride ion battery according to claim 1, wherein the x satisfies $1.8 \leq x \leq 2$.

* * * * *

UNITED STATES PATENT AND TRADEMARK OFFICE
CERTIFICATE OF CORRECTION

PATENT NO. : 10,529,988 B2  
APPLICATION NO. : 15/954920  
DATED : January 7, 2020  
INVENTOR(S) : Hidenori Miki et al.

Page 1 of 1

It is certified that error appears in the above-identified patent and that said Letters Patent is hereby corrected as shown below:

In the Specification

In Column 4, Line 31, delete "measure" and insert --measured--, therefor.

Signed and Sealed this  
Thirty-first Day of March, 2020

Andrei Iancu  
*Director of the United States Patent and Trademark Office*